United States Patent
Jia et al.

(10) Patent No.: US 11,186,694 B2
(45) Date of Patent: Nov. 30, 2021

(54) POLYOLEFIN POROUS SEPARATOR AND PREPARATION METHOD THEREOF

(71) Applicant: JIANGSU HORIZON NEW ENERGY TECH CO., LTD., Changzhou (CN)

(72) Inventors: Peiliang Jia, Changzhou (CN); Xingxing Weng, Changzhou (CN); Taotao Liu, Changzhou (CN); Zhengli Wang, Changzhou (CN); Aibin Sun, Changzhou (CN)

(73) Assignee: JIANGSU HORIZON NEW ENERGY TECH CO., LTD., Changzhou (CN)

(*) Notice: Subject to any disclaimer, the term of this patent is extended or adjusted under 35 U.S.C. 154(b) by 0 days.

(21) Appl. No.: 17/256,234

(22) PCT Filed: May 21, 2020

(86) PCT No.: PCT/CN2020/091494
§ 371 (c)(1),
(2) Date: Dec. 28, 2020

(87) PCT Pub. No.: WO2021/164143
PCT Pub. Date: Aug. 26, 2021

(65) Prior Publication Data
US 2021/0253812 A1 Aug. 19, 2021

(30) Foreign Application Priority Data
Feb. 18, 2020 (CN) .......................... 202010100747.X

(51) Int. Cl.
| | | |
|---|---|---|
| *C08L 23/04* | (2006.01) | |
| *C08L 23/06* | (2006.01) | |
| *H01M 50/409* | (2021.01) | |
| *B29C 55/12* | (2006.01) | |
| *C08J 5/18* | (2006.01) | |
| *H01M 10/0525* | (2010.01) | |
| *H01M 50/406* | (2021.01) | |
| *H01M 50/417* | (2021.01) | |
| *B29C 48/00* | (2019.01) | |
| *B29C 48/08* | (2019.01) | |
| *B29C 48/91* | (2019.01) | |
| *B29C 55/00* | (2006.01) | |
| *B29C 55/14* | (2006.01) | |
| *B29C 71/00* | (2006.01) | |
| *B29C 48/40* | (2019.01) | |
| *B29L 31/34* | (2006.01) | |
| *B29K 23/00* | (2006.01) | |

(52) U.S. Cl.
CPC .............. *C08J 5/18* (2013.01); *B29C 48/0018* (2019.02); *B29C 48/022* (2019.02); *B29C 48/08* (2019.02); *B29C 48/40* (2019.02); *B29C 48/91* (2019.02); *B29C 55/005* (2013.01); *B29C 55/143* (2013.01); *B29C 71/0009* (2013.01); *C08L 23/06* (2013.01); *H01M 10/0525* (2013.01); *H01M 50/406* (2021.01); *H01M 50/417* (2021.01); *B29C 2071/0027* (2013.01); *B29K 2023/0683* (2013.01); *B29L 2031/3468* (2013.01); *C08J 2323/06* (2013.01); *C08J 2423/06* (2013.01); *C08L 2205/025* (2013.01); *C08L 2207/068* (2013.01)

(58) Field of Classification Search
CPC .... C08L 23/06; C08L 23/04; C08L 2205/025; C08L 2205/02; C08L 2207/068; C08L 2207/062; H01M 50/417; H01M 50/409; B29C 48/0018; B29C 55/12; B29C 55/143; B29D 7/01
See application file for complete search history.

(56) References Cited

U.S. PATENT DOCUMENTS

| | | | | |
|---|---|---|---|---|
| 8,021,789 | B2 * | 9/2011 | Takita ................. | H01M 50/411 429/254 |
| 8,906,539 | B2 * | 12/2014 | Takita ................... | C08L 23/04 429/144 |
| 9,096,746 | B2 * | 8/2015 | Mikawa ................ | C08L 23/06 |
| | | (Continued) | | |
| 9,362,540 | B2 * | 6/2016 | Ogawa .............. | H01M 10/0525 |
| 9,783,661 | B2 * | 10/2017 | Dou ........................ | C08L 23/04 |
| 10,388,928 | B2 * | 8/2019 | Sawada ............... | H01M 50/411 |
| 2011/0027642 | A1 * | 2/2011 | Lee ..................... | B01D 67/0079 429/145 |
| 2011/0117439 | A1 * | 5/2011 | Yamada ................. | B01D 71/26 429/254 |
| 2011/0206973 | A1 * | 8/2011 | Brant ..................... | B01D 69/12 429/145 |
| 2011/0223407 | A1 * | 9/2011 | Ban ....................... | B01D 67/002 428/220 |

FOREIGN PATENT DOCUMENTS

| | | | | |
|---|---|---|---|---|
| CN | 102473887 | A | 5/2012 | |
| CN | 111180645 | A * | 5/2020 | ............. B29C 48/00 |
| | (Continued) | | | |

OTHER PUBLICATIONS

CN 111180645A (May 19, 2020); machine translation. (Year: 2020).*

*Primary Examiner* — Rip A Lee
(74) *Attorney, Agent, or Firm* — Bayramoglu Law Offices LLC

(57) ABSTRACT

A polyolefin porous separator includes a first surface and a second surface corresponding to the first surface. The surfaces of the polyolefin porous separator contain dendritic crystals and micropores, the dendritic crystals intersect with the micropores on the first surface or/and the second surface, and the dendritic crystals penetrate through the second surface from the first surface. A preparation method of the polyolefin porous separator includes: (1) a mixed melting of polyethylene resin and a mineral oil; (2) an extrusion of the mineral oil/polyethylene resin molten mixture; (3) a stretching of a thick sheet in a machine direction (MD); (4) a stretching of the separator in a transverse direction (TD); (5) immersing the separator into a solvent to extract the mineral oil; (6) a secondary stretching of the separator in the TD; and (7) subjecting the separator having the longitudinal crystals to a heat-setting treatment and then rolling up.

9 Claims, No Drawings

(56) References Cited

U.S. PATENT DOCUMENTS

| | | | | |
|---|---|---|---|---|
| 2012/0168976 A1* | 7/2012 | Luo | ................ | C08L 23/04 264/53 |
| 2020/0020908 A1* | 1/2020 | Nishimura | .......... | H01M 50/403 |
| 2020/0343506 A1* | 10/2020 | Kim | ................ | H01M 50/411 |

FOREIGN PATENT DOCUMENTS

| | | | |
|---|---|---|---|
| JP | 2001226515 A | 8/2001 |
| JP | 2001294685 A | 10/2001 |

* cited by examiner

POLYOLEFIN POROUS SEPARATOR AND PREPARATION METHOD THEREOF

CROSS REFERENCE TO THE RELATED APPLICATIONS

This application is the national phase entry of International Application No. PCT/CN2020/091494, filed on May 21, 2020, which is based upon and claims priority to Chinese Patent Application No. 202010100747.X, filed on Feb. 18, 2020, the entire contents of which are incorporated herein by reference.

TECHNICAL FIELD

The present invention relates to the technical field of lithium-ion batteries, and in particular, to a polyolefin porous separator and a preparation method thereof.

BACKGROUND

Lithium-ion batteries are becoming more extensively used in practice, and increased requirements are imposed on their performance as they become more ubiquitous. Therefore, many battery enterprises have invested heavily in the research and development of high-capacity lithium-ion batteries. With the development of new energy vehicles, the public demands that lithium-ion batteries be safe and not explode or spontaneously combust. As a result, new requirements for safety performance are also proposed for the separators applied in batteries. It is an urgent problem for separator researchers to maximize the separator's mechanical properties, including tensile strength and puncture resistance.

SUMMARY

The technical solution adopted by the present invention to solve the technical problem is to provide a polyolefin porous separator, including a first surface and a second surface corresponding to the first surface. Surfaces of the polyolefin porous separator contain dendritic crystals and micropores. The dendritic crystals intersect with the micropores on the first surface or/and the second surface and penetrate through the second surface from the first surface.

As a preferred embodiment of the present invention, a width of the dendritic crystals is 0.25-0.5 µm.

As a preferred embodiment of the present invention, an average number of the dendritic crystals contained in the polyolefin porous separator per square micron is 2-8.

Another technical solution adopted by the present invention to solve the technical problem is to provide a preparation method of the polyolefin porous separator, including the following steps:

(1) mixed melting of polyethylene resin and a mineral oil: feeding the polyethylene resin and the mineral oil into a twin-screw extruder through two feed inlets, respectively, wherein the mineral oil is put into a first feed inlet, and a mixture of the mineral oil and the polyethylene resin is put into a second feed inlet, and setting a temperature above the melting temperature of the polyethylene resin to form a mineral oil/polyethylene resin molten mixture;

(2) extrusion of the mineral oil/polyethylene resin molten mixture: extruding the mineral oil/polyethylene resin molten mixture into a thick sheet by a T-shaped die head of the twin-screw extruder;

(3) stretching of the thick sheet in a machine direction (MD): passing the thick sheet through 6 sets of stretching rollers, keeping a temperature between 150° C.-170° C., and controlling a speed ratio of two adjacent stretching rollers between 1.2-1.8, to form a separator;

(4) first stretching of the separator in a transverse direction (TD): stretching the separator transversely to 9-12 times;

(5) immersing the separator into a solvent to extract the mineral oil;

(6) secondary stretching of the separator in the TD: stretching the separator transversely to 1.2-1.4 times to form longitudinal crystals in the separator; and (7) subjecting the separator having the longitudinal crystals to a heat-setting treatment and then rolling up.

As a preferred embodiment of the present invention, the polyethylene resin in step (1) is a mixed resin of ultra-high molecular weight polyethylene (UHMWPE) resin and high molecular weight polyethylene (HMWPE) resin, wherein a molecular weight of the UHMWPE resin is more than 1,800,000, and a molecular weight of the HMWPE resin is 600,000-700,000.

As a preferred embodiment of the present invention, mass percentages of the UHMWPE resin, the HMWPE resin and the mineral oil are 15%-20%, 5%-10% and 70%-80%, respectively, and a total mass percentage of the UHMWPE resin, the HMWPE resin and the mineral oil is 100%.

As a preferred embodiment of the present invention, an extrusion temperature in step (2) is 10-15° C. lower than the melting temperature.

As a preferred embodiment of the present invention, a pressure of the T-shaped die head in step (2) is 0.1-0.3 MPa.

As a preferred embodiment of the present invention, the solvent in step (5) is dichloromethane.

The advantages of the present invention are as follows: the present invention can improve the mechanical properties of the polyolefin porous separator, such as tensile strength, puncture strength, etc.; the preparation method of the present invention can prepare the polyolefin porous separator with excellent tensile properties.

DETAILED DESCRIPTION OF THE EMBODIMENTS

The present invention mainly makes the prepared separator have a specific crystal structure at the microscopic level by adjusting raw material formula and improving processing technology in the preparation process of the separator, and the prepared separator shows a dendritic crystal structure.

The microstructure of the separator in a lithium-ion battery contains dendrite crystals and micropores that intersect on a flat surface. The dendrite crystals penetrate through both surfaces of the separator, and have a width of 0.25-0.5 µm. The number of dendrite crystals in the separator per unit area can be observed by scanning electron microscopy. The average number of dendrite crystals in the separator per square micron is 2-8.

The raw materials used in the present invention are polyethylene and mineral oil, in which the polyethylene is a mixed resin of UHMWPE resin and HMWPE resin. The molecular weight of the UHMWPE is more than 1,800,000, and the molecular weight of the HMWPE is 600,000-700,000. The present invention has no special requirements for the mineral oil. Any industrial grade mineral oil or paraffin oil can be adopted. The mass percentages of the UHMWPE, the HMWPE and the mineral oil are 15%-20%, 5%-10% and 70%-80%, respectively.

The preparation method adopts the thermally induced phase separation (TIPS) process, and the preparation steps are as follows.

(1) In the mixed melting stage of polyethylene resin and a mineral oil, the polyethylene resin and the mineral oil are respectively fed into a twin-screw extruder through two feed inlets. Only the mineral oil is put into the first feed inlet, and a mixture of the mineral oil and the polyethylene resin is put into the second feed inlet. The temperature is set above the melting temperature of polyethylene. The specific temperature varies according to different raw materials, so the present invention does not make specific limits.

(2) In the extrusion process of the mineral oil/polyethylene resin molten mixture, the molten mixture is extruded into a thick sheet by a T-shaped die head of the extruder. The extrusion temperature is 10-15° C. lower than the melting temperature, and the pressure of the die head is controlled between 0.1-0.3 MPa.

(3) In the MD stretching process of the cast sheet, there are 6 sets of stretching rollers. In this process, the stretching temperature and the speed ratio between the stretching rollers need to be controlled. The temperature is kept between 150° C.-170° C., and the speed ratio of two adjacent stretching rollers is controlled between 1.2-1.8.

(4) In the first TD (TD1) stretching process, the separator is stretched transversely to 9-12 times.

(5) The separator is immersed into dichloromethane to extract the mineral oil.

(6) In the second TD (TD2) stretching process, the separator is stretched transversely to 1.2-1.4 times to ensure the formation of longitudinal crystals in the separator.

(7) The stretched separator is successively subjected to a heat-setting treatment and being rolled up.

In order to make the above-mentioned objectives, features and advantages of the present invention more obvious and easy to understand, the present invention is further described in detail in combination with the specific implementation modes.

Example 1

| Raw materials and preparation process | | Properties of separator | |
|---|---|---|---|
| Mn (UHMWPE) & w % | 1,800,000/15 | n (number/µm$^2$) | 4 |
| Mn (HDPE) & w % | 600,000/5 | d (µm) | 0.26 |
| Mineral oil (w %) | 80 | MD tensile strength (Kgf/cm$^2$) | 3104 |
| MD speed ratio of stretching rollers | | TD tensile strength (Kgf/cm$^2$) | 3546 |
| 1/2# roller speed ratio | 1.2 | MD elongation ratio (%) | 212 |
| 2/3# roller speed ratio | 1.3 | TD elongation ratio (%) | 238 |
| 3/4# roller speed ratio | 1.5 | Frontal puncture strength (gf) | 496 |
| 4/5# roller speed ratio | 1.6 | Reverse puncture strength (gf) | 482 |
| 5/6# roller speed ratio | 1.5 | | |
| TD1 stretching multiple | 9 | | |
| TD2 stretching multiple | 1.2 | | |

Note:
n is the number of dendritic crystals per unit area (number/µm$^2$);
d is the average width of dendritic crystals per unit area (µm).

Example 2

| Raw materials and preparation process | | Properties of separator | |
|---|---|---|---|
| Mn (UHMWPE) & w % | 2,100,000/15 | n (number/µm$^2$) | 3.5 |
| Mn (HDPE) & w % | 650,000/5 | d (µm) | 0.31 |
| Mineral oil (w %) | 80 | MD tensile strength (Kgf/cm$^2$) | 3304 |
| MD speed ratio of stretching rollers | | TD tensile strength (Kgf/cm$^2$) | 3646 |
| 1/2# roller speed ratio | 1.2 | MD elongation ratio (%) | 246 |
| 2/3# roller speed ratio | 1.3 | TD elongation ratio (%) | 273 |
| 3/4# roller speed ratio | 1.5 | Frontal puncture strength (gf) | 527 |
| 4/5# roller speed ratio | 1.6 | Reverse puncture strength (gf) | 531 |
| 5/6# roller speed ratio | 1.5 | | |
| TD1 stretching multiple | 9 | | |
| TD2 stretching multiple | 1.2 | | |

Example 3

| Raw materials and preparation process | | Properties of separator | |
|---|---|---|---|
| Mn (UHMWPE) & w % | 1,800,000/15 | n (number/µm$^2$) | 5.1 |
| Mn (HDPE) & w % | 600,000/5 | d (µm) | 0.18 |
| Mineral oil (w %) | 75 | MD tensile strength (Kgf/cm$^2$) | 2816 |
| MD speed ratio of stretching rollers | | TD tensile strength (Kgf/cm$^2$) | 2934 |
| 1/2# roller speed ratio | 1.2 | MD elongation ratio (%) | 195 |
| 2/3# roller speed ratio | 1.3 | TD elongation ratio (%) | 170 |
| 3/4# roller speed ratio | 1.5 | Frontal puncture strength (gf) | 428 |
| 4/5# roller speed ratio | 1.6 | Reverse puncture strength (gf) | 437 |
| 5/6# roller speed ratio | 1.5 | | |
| TD1 stretching multiple | 9 | | |
| TD2 stretching multiple | 1.2 | | |

Example 4

| Raw materials and preparation process | | Properties of separator | |
|---|---|---|---|
| Mn (UHMWPE) & w % | 1,800,000/15 | n (number/µm$^2$) | 3.7 |
| Mn (HDPE) & w % | 600,000/5 | d (µm) | 0.28 |
| Mineral oil (w %) | 80 | MD tensile strength (Kgf/cm$^2$) | 3209 |
| MD speed ratio of stretching rollers | | TD tensile strength (Kgf/cm$^2$) | 3567 |
| 1/2# roller speed ratio | 1.3 | MD elongation ratio (%) | 216 |
| 2/3# roller speed ratio | 1.4 | TD elongation ratio (%) | 246 |
| 3/4# roller speed ratio | 1.4 | Frontal puncture strength (gf) | 514 |
| 4/5# roller speed ratio | 1.6 | Reverse puncture strength (gf) | 536 |
| 5/6# roller speed ratio | 1.6 | | |
| TD1 stretching multiple | 9 | | |
| TD2 stretching multiple | 1.2 | | |

Example 5

| Raw materials and preparation process | | Properties of separator | |
|---|---|---|---|
| Mn (UHMWPE) & w % | 1,800,000/15 | n (number/μm²) | 6 |
| Mn (HDPE) & w % | 600,000/5 | d (μm) | 0.08 |
| Mineral oil (w %) | 80 | MD tensile strength (Kgf/cm²) | 2496 |
| MD speed ratio of stretching rollers | | TD tensile strength (Kgf/cm²) | 2671 |
| 1/2# roller speed ratio | 1.2 | MD elongation ratio (%) | 281 |
| 2/3# roller speed ratio | 1.3 | TD elongation ratio (%) | 293 |
| 3/4# roller speed ratio | 1.5 | Frontal puncture strength (gf) | 483 |
| 4/5# roller speed ratio | 1.6 | Reverse puncture strength (gf) | 467 |
| 5/6# roller speed ratio | 1.5 | | |
| TD1 stretching multiple | 10 | | |
| TD2 stretching multiple | 1.4 | | |

The following is a comparison between example 4 and the prior art:

| Properties of separators | Example 4 | Comparative example 1 | Comparative example 2 | Comparative example 3 | Comparative example 4 |
|---|---|---|---|---|---|
| n (number/μm²) | 3.7 | 7.4 | 6.1 | 5.4 | 4.7 |
| d (μm) | 0.28 | 0.04 | 0.11 | 0.21 | 0.34 |
| MD tensile strength (Kgf/cm²) | 3209 | 2416 | 1937 | 2739 | 3128 |
| TD tensile strength (Kgf/cm²) | 3567 | 2601 | 2483 | 2941 | 3309 |
| MD elongation ratio (%) | 216 | 239 | 223 | 169 | 143 |
| TD elongation ratio (%) | 246 | 240 | 249 | 184 | 169 |
| Frontal puncture strength (gf) | 514 | 386 | 409 | 372 | 412 |
| Reverse puncture strength (gf) | 536 | 361 | 394 | 393 | 429 |

In conclusion, the polyolefin porous separator and its preparation method can ensure the thickness of the separator and meanwhile significantly improve its mechanical tensile properties and puncture resistance.

Based on the above ideal embodiments of the present invention as an inspiration, technical personnel in this field may make various variations and modifications within the scope of not deviating from the technical idea of the present invention. The technical scope of the present invention is not limited to the contents in the description, and the technical scope shall be determined according to the scope of claims.

What is claimed is:

1. A polyolefin porous separator, comprising a first surface and a second surface corresponding to the first surface, wherein, the first surface and the second surface of the polyolefin porous separator contain dendritic crystals and micropores, the dendritic crystals intersect with the micropores on the first surface or/and the second surface, and the dendritic crystals penetrate through the second surface from the first surface;
wherein a preparation method of the polyolefin porous separator comprises the following steps:
(1) melt mixing polyethylene resin and a mineral oil comprising feeding the polyethylene resin and the mineral oil into a twin-screw extruder through two feed inlets, respectively, wherein the mineral oil is put into a first feed inlet of the two feed inlets, and a mixture of the mineral oil and the polyethylene resin is put into a second feed inlet of the two feed inlets, and setting a first temperature above a melting temperature of the polyethylene resin to form a mineral oil/polyethylene resin molten mixture;
(2) extruding the mineral oil/polyethylene resin molten mixture into a thick sheet by a T-shaped die head of the twin-screw extruder;
(3) performing a stretching of the thick sheet in a machine direction (MD) by passing the thick sheet through 6 sets of stretching rollers, keeping a second temperature between 150° C.-170° C., and controlling a speed ratio of two adjacent stretching rollers of the 6 sets of stretching rollers between 1.2-1.8, to form a separator intermediate;
(4) performing a first stretching of the separator intermediate in a transverse direction (TD) 9-12 times;
(5) immersing the separator intermediate into a solvent to extract the mineral oil;
(6) performing a secondary stretching of the separator intermediate in the TD 1.2-1.4 times to form longitudinal crystals in the separator intermediate; and
(7) subjecting the separator intermediate having the longitudinal crystals to a heat-setting treatment and then rolling up to obtain the polyolefin porous separator.

2. The polyolefin porous separator according to claim 1, wherein a width of the dendritic crystals is 0.25-0.5 μm.

3. The polyolefin porous separator according to claim 1, wherein an average number of the dendritic crystals contained in the polyolefin porous separator per square micron is 2-8.

4. A preparation method of a polyolefin porous separator, comprising the following steps:
(1) melt mixing polyethylene resin and a mineral oil comprising feeding the polyethylene resin and the mineral oil into a twin-screw extruder through two feed inlets, respectively, wherein the mineral oil is put into a first feed inlet of the two feed inlets, and a mixture of the mineral oil and the polyethylene resin is put into a second feed inlet of the two feed inlets, and setting a first temperature above a melting temperature of the polyethylene resin to form a mineral oil/polyethylene resin molten mixture;
(2) extruding the mineral oil/polyethylene resin molten mixture into a thick sheet by a T-shaped die head of the twin-screw extruder;
(3) performing a stretching of the thick sheet in a machine direction (MD) by passing the thick sheet through 6 sets of stretching rollers, keeping a second temperature between 150° C.-170° C., and controlling a speed ratio of two adjacent stretching rollers of the 6 sets of stretching rollers between 1.2-1.8 to form a separator intermediate;
(4) performing a first stretching of the separator intermediate in a transverse direction (TD) 9-12 times;

(5) immersing the separator intermediate into a solvent to extract the mineral oil;

(6) performing a secondary stretching of the separator intermediate in the TD 1.2-1.4 times to form longitudinal crystals in the separator intermediate; and (7) subjecting the separator intermediate having the longitudinal crystals to a heat-setting treatment and then rolling up to obtain the polyolefin porous separator.

5. The preparation method of the polyolefin porous separator according to claim 4, wherein the polyethylene resin in step (1) is a mixed resin of an ultra-high molecular weight polyethylene (UHMWPE) resin and high molecular weight polyethylene (HMWPE) resin, a molecular weight of the UHMWPE resin is more than 1,800,000, and a molecular weight of the HMWPE resin is 600,000-700,000.

6. The preparation method of the polyolefin porous separator according to claim 5, wherein, mass percentages of the UHMWPE resin, the HMWPE resin and the mineral oil are 15%-20%, 5%-10% and 70%-80%, respectively, and a total mass percentage of the UHMWPE resin, the HMWPE resin and the mineral oil is 100%.

7. The preparation method of the polyolefin porous separator according to claim 4, wherein an extrusion temperature in step (2) is 10-15° C. lower than the melting temperature of the polyethylene resin.

8. The preparation method of the polyolefin porous separator according to claim 4, wherein a pressure of the T-shaped die head in step (2) is 0.1-0.3 MPa.

9. The preparation method of the polyolefin porous separator according to claim 4, wherein the solvent in step (5) is dichloromethane.

* * * * *